United States Patent
Wu

(10) Patent No.: US 6,579,119 B1
(45) Date of Patent: Jun. 17, 2003

(54) BATTERY HOLDER

(75) Inventor: Jerry Wu, Irvine, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/138,771

(22) Filed: May 3, 2002

(51) Int. Cl.⁷ .............................................. H01R 3/00
(52) U.S. Cl. ..................................... 439/500; 429/100
(58) Field of Search ................................ 439/500, 627, 439/698, 830; 429/96, 97, 99, 100

(56) References Cited

U.S. PATENT DOCUMENTS

| | | | | |
|---|---|---|---|---|
| 3,181,974 A | * | 5/1965 | Barbera | 429/100 |
| 5,211,579 A | * | 5/1993 | Seong et al. | 439/500 |
| 5,395,263 A | * | 3/1995 | Sandell | 439/500 |
| 6,293,819 B1 | * | 9/2001 | Wu | 439/500 |
| 6,413,117 B1 | * | 7/2002 | Annerino et al. | 439/500 |

OTHER PUBLICATIONS

Larry Nembhard, Battery Connectors Provide Power To Go, Connector Specifier, Sep. 2000, pp. 22–23.

* cited by examiner

Primary Examiner—Hien Vu
(74) Attorney, Agent, or Firm—Wei Te Chung

(57) ABSTRACT

A battery holder (1) includes a dielectric housing (2) including a pair of end walls (21, 22) and a pair of sidewalls (23, 24) to thereby define a receiving space (20), and a pair of conductive contacts (3) retained in the end walls. Each end wall defines a slit (210, 220) in a top surface thereof. Each contact includes a main portion (30) received in the slit, a contact portion (32) projecting into the receiving space for electrically contacting with an inserted battery (4) and a pair of side beams (36) extending inwardly. Each side beam has a first section (360) substantially perpendicular to the main portion, a second section (362) integrally upwardly extending from the first section. The second section has a body (364) integrally connected with the first section and an arm (366) bent inwardly from the body for abutting against the battery.

4 Claims, 6 Drawing Sheets

BATTERY HOLDER

BACKGROUND OF THE INVENTION

1. Field of the Invention

The present invention relates to battery holders, and particularly to battery holders for holding cylindrically shaped batteries.

2. Description of Related Art

Battery holders are used for holding various types of batteries, such as back up batteries for rear time clocks in desktop computers. The battery holders of the back up batteries are mounted on mother boards of the desktop computers. Traditional battery holders can be referred to pages 22–23 of "Connector Specifier" published on September 2000, which is submitted herewith by Information Disclosure Statement (IDS), and U.S. Pat. Nos. 5,395,263, 5,211,579, 5,537,022, 5,528,460 and 5,431,575. A battery holder disclosed in U.S. Pat. No. 5,537,022 is of two-piece configuration including a seat in which two AA batteries are received and a cover snapping over the seat to hold the batteries in the seat against removal. However, assembling the cover to the seat is complicated and time-consuming. In addition, the seat and the cover are of different configuration due to their distinct functions, thereby requiring different molds to form them. Thus, the manufacturing cost is increased.

U.S. Pat. Nos. 5,211,579 and 5,395,263 each disclose a battery holder addressing to the problem encountered by the '022 patent. A battery holder disclosed in U.S. Pat. No. 5,211,579 comprises an insulating housing having a pair of opposite end walls, and a pair of conductive contacts respectively fixed adjacent to the end walls for electrically contacting with an inserted battery. One of the end walls defines a recess with a negative end of the inserted battery received therein. A conductive contact away from the recess has a latching projection overlying a positive end of the inserted battery. The recess and the latching projection together hold the battery against removal from the housing. However, because the insulating housing of the holder is made of plastic, the end walls thereof can hardly move to allow an easy insertion of the battery into the holder, which results in that the battery is difficult to be assembled to the holder.

U.S. Pat. No. 5,395,263 discloses a battery holder including two independent contacts located at one end of the holder to electrically contact with one ends of two inserted AA batteries. A retainer is located at another end of the holder to electrically contact with the other ends of the batteries. The retainer has two elastic side clips for securing the batteries in the holder. However, each side clip of the retainer cannot provide a large deformation due to its configuration, whereby the batteries can not be reliably retained in the holder.

Hence, the present invention aims to provide a battery holder having contacts having better elasticity to overcome the disadvantages of the prior art devices. A copending application Ser. No. 10/116,293 filed Apr. 3, 2002, having the same applicant and the same assignee with the invention, discloses some approach.

SUMMARY OF THE INVENTION

Accordingly, one object of the present invention is to provide a battery holder having a pair of conductive contacts for stably retaining an inserted battery in the holder.

In order to achieve the object set forth, a holder for holding a battery in accordance with the present invention comprises a dielectric housing including a pair of opposite end walls and a pair of sidewalls to thereby define a receiving space, and a pair of conductive contacts retained in the end walls. Each contact includes a contact portion projecting into the receiving space for electrically engaging with an inserted battery, and a tail extending downward for connecting to a circuit board. One of the contacts includes a pair of side beams. Each side beam has a first section and a second section integrally upwardly extending from the first section. The second section has a body perpendicular to the first section and an arm bent inwardly to be formed at an acute angle with respect to the body for abutting against the battery. The second section of the side beam defines a channel to further increase elasticity of the side beam.

Other objects, advantages and novel features of the invention will become more apparent from the following detailed description when taken in conjunction with the accompanying drawings.

DETAILED DESCRIPTION OF THE INVENTION

Figure 1:
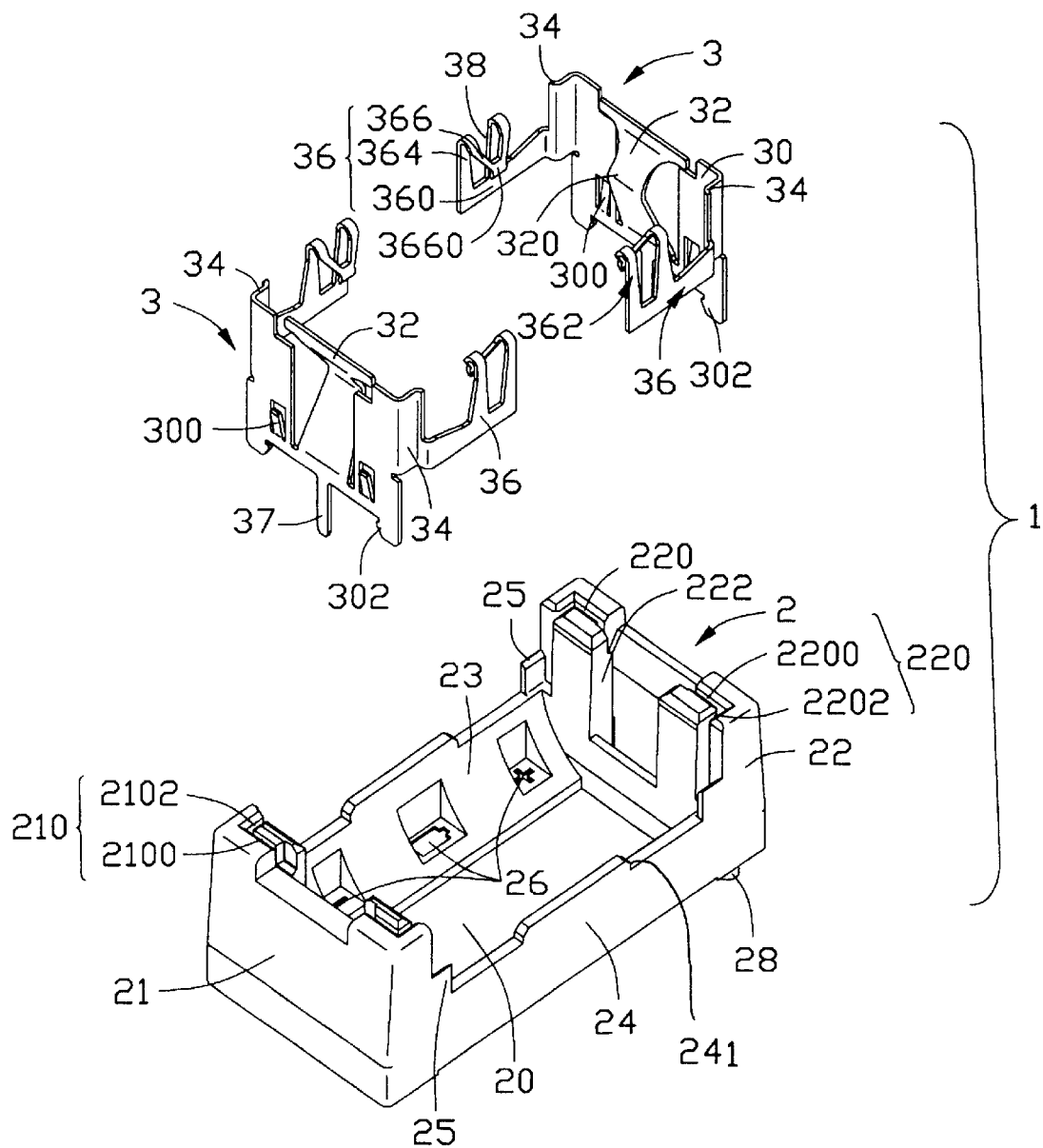
FIG. 1 is an exploded perspective view of a battery holder in accordance with the present invention.
Figure 2:
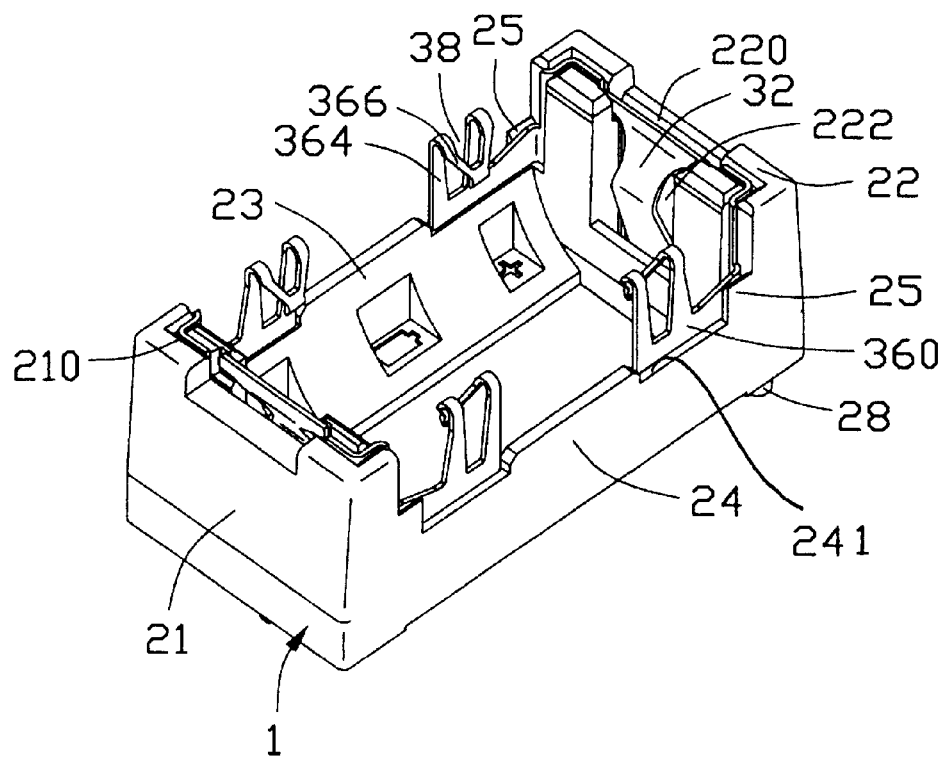
FIG. 2 is an assembled perspective view of the battery holder shown in FIG. 1.
Figure 3:
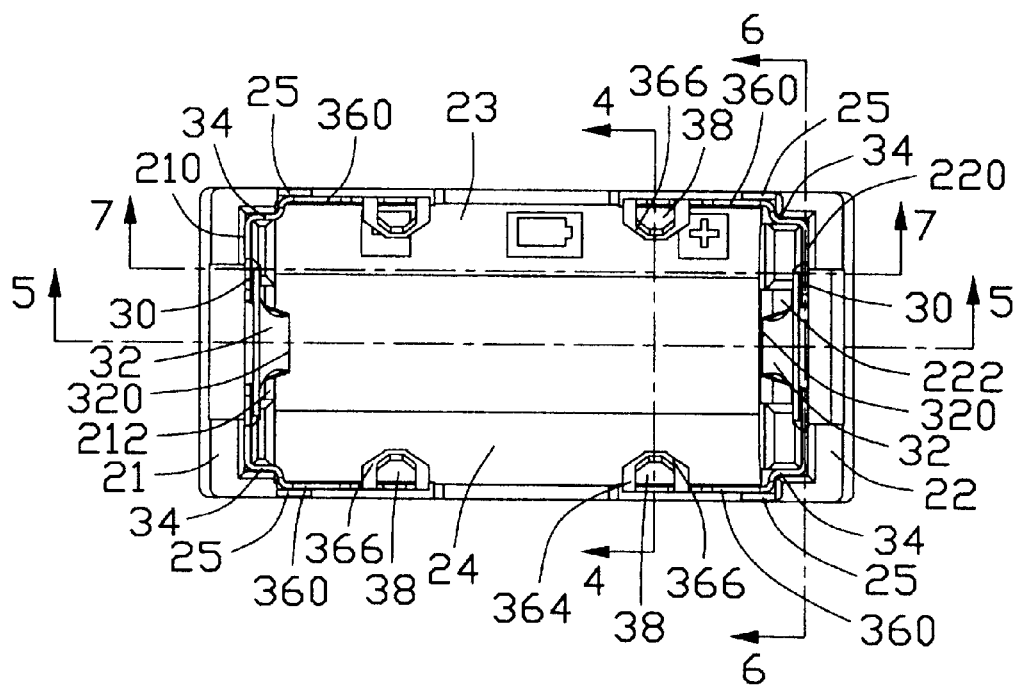
FIG. 3 is a top plan view of the battery holder of FIG. 2.
Figure 4:
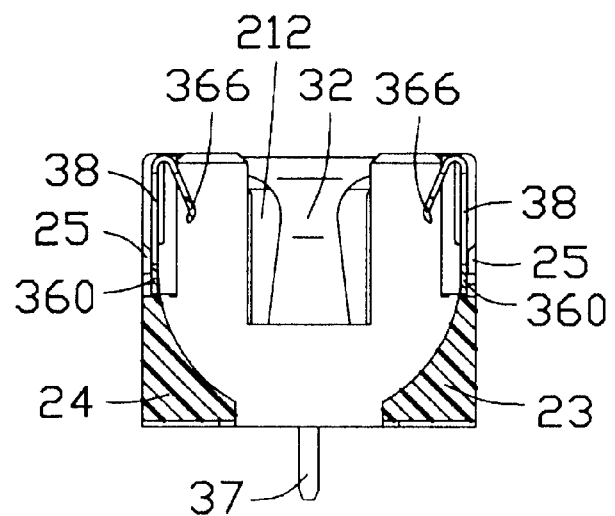
FIG. 4 is a cross-sectional view of the battery holder taken along section line 4—4 of FIG. 3.
Figure 5:
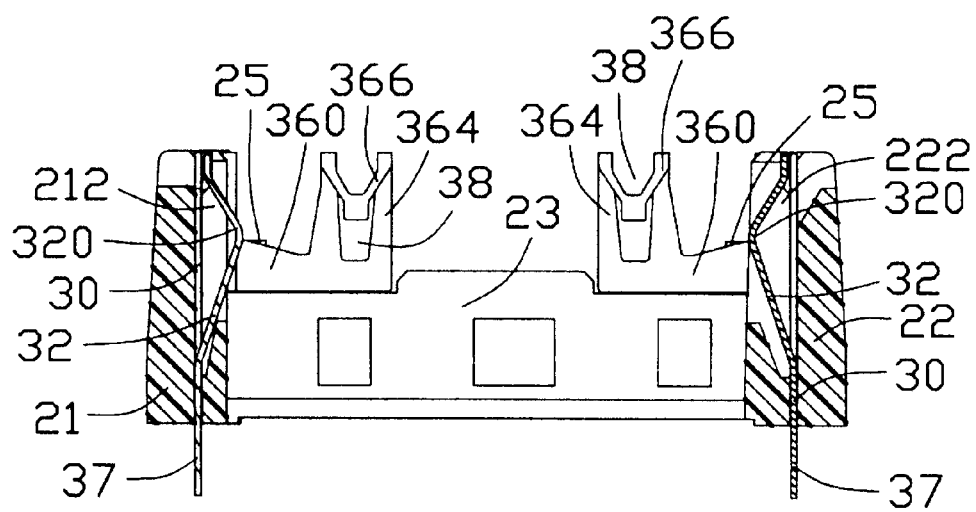
FIG. 5 is a cross-sectional view of the battery holder taken along section line 5—5 of FIG. 3.
Figure 6:
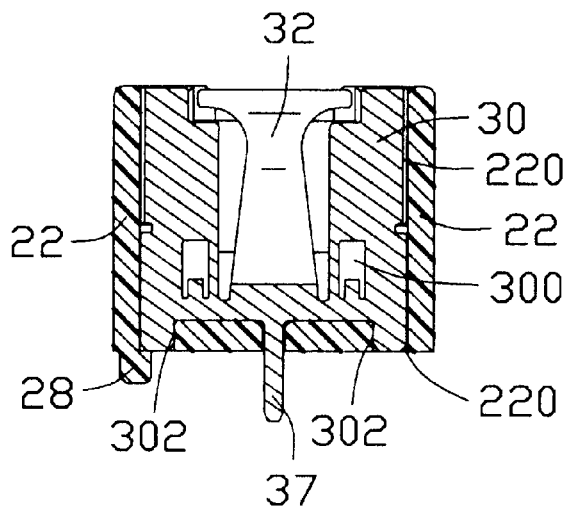
FIG. 6 is a cross-sectional view of the battery holder taken along section line 6—6 of FIG. 3.
Figure 8:
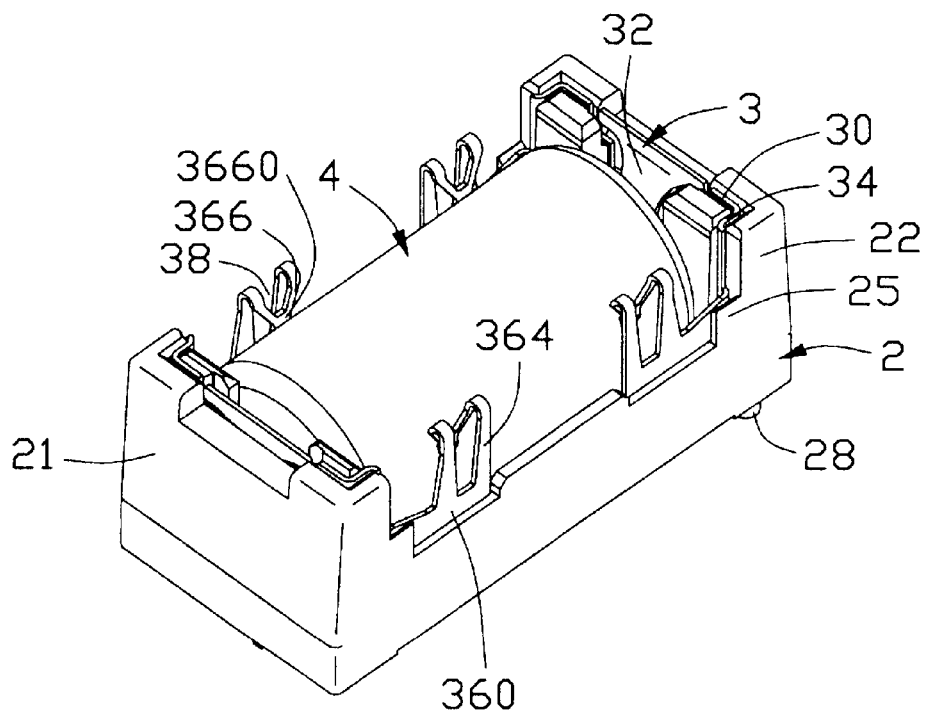
FIG. 8 is a perspective view showing a battery retained in the battery holder.
Figure 9:
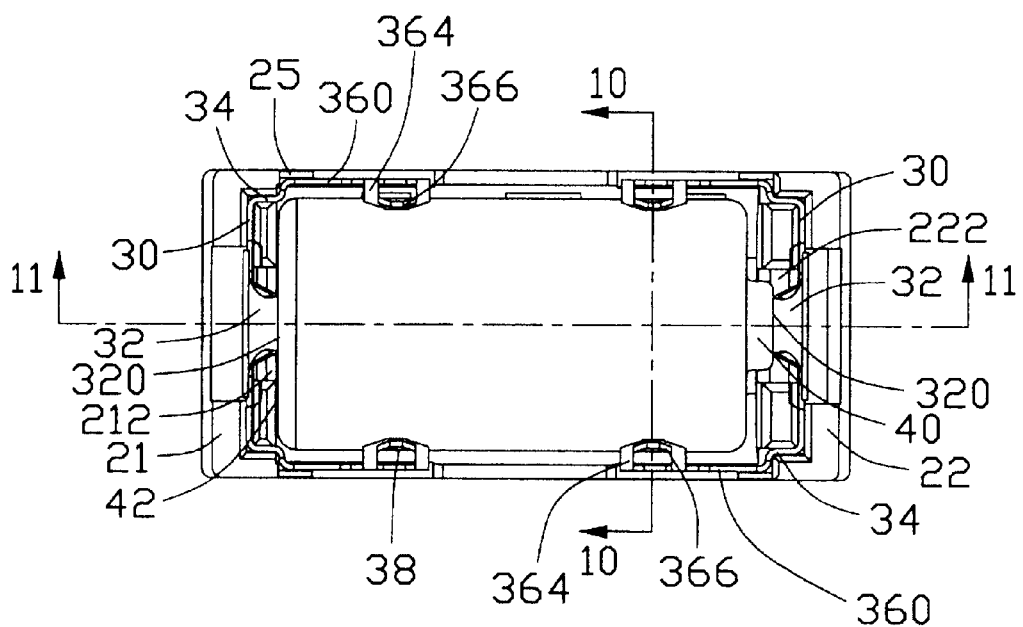
FIG. 9 is a top plan view of FIG. 8.
Figure 10:
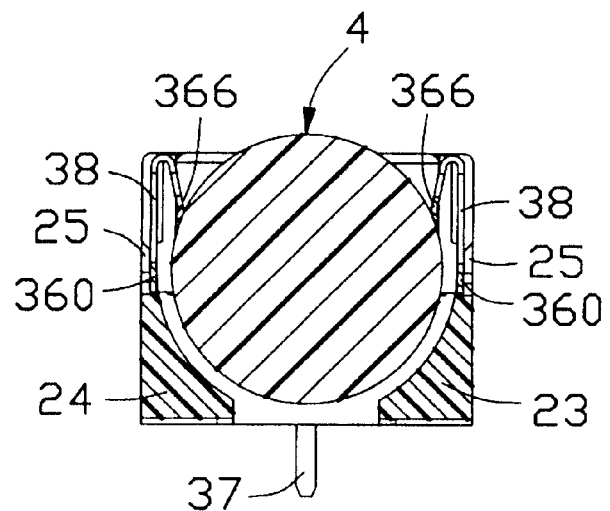
FIG. 10 is a cross-sectional view taken along section line 10—10 of FIG. 9.
Figure 11:
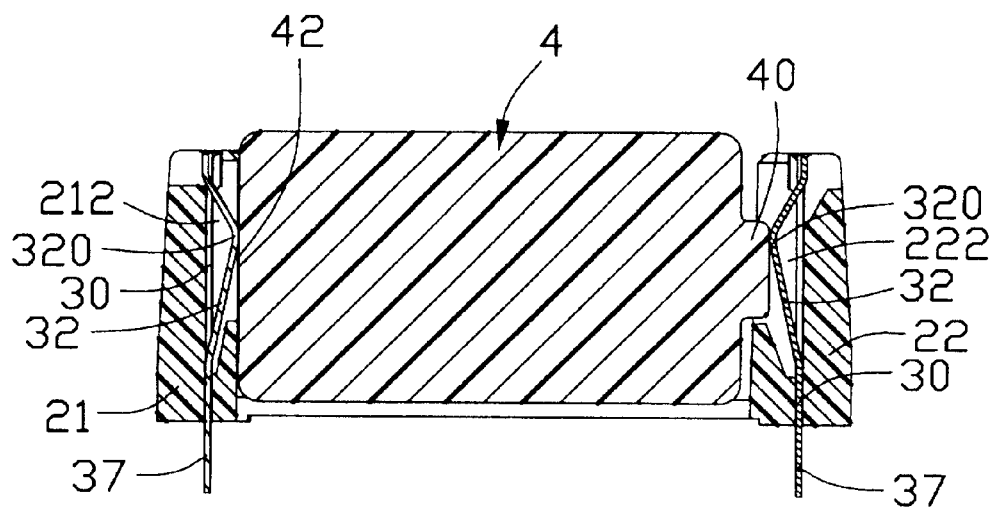
FIG. 11 is a cross-sectional view taken along section line 11—11 of FIG. 9.

Referring to FIG. 1, a battery holder 1 for holding a battery 4 (shown in FIG. 8) in accordance with the present invention comprises a dielectric housing 2 and a pair of conductive contacts 3 for being fixedly retained in the housing 2. In a preferred embodiment of the present invention, the battery 4 is a ½AA 3.6 V lithium cell battery.

The dielectric housing 2 is generally in a rectangular box-like form. The housing 2 comprises a pair of upwardly extending end walls 21, 22 at opposite ends in a longitudinal direction of the housing 2 and a pair of upwardly extending sidewalls 23, 24 integrally connected with the end walls 21, 22 to thereby define a receiving space 20. Each end wall 21 (22) defines a slit 210 (220) extending through a top surface thereof and a recess 212 (222) in an inner surface thereof to communicate with the slit 210 (220). The slit 210 (220) has a first portion 2100 (2200) extending in a transverse direction of the housing 2 and a pair of second portions 2102 (2202) extending in the longitudinal direction of the housing 2 to communicate with the receiving space 20.

Figure 7:
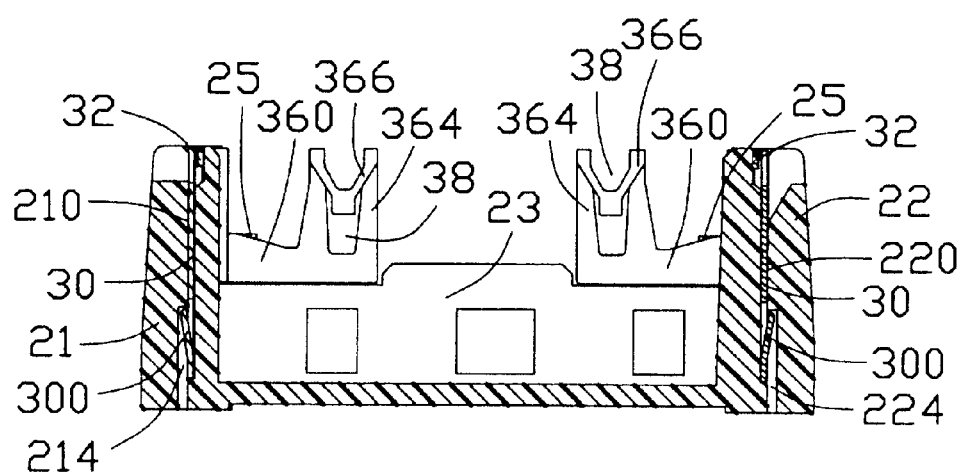
FIG. 7 is a cross-sectional view of the battery holder taken along section line 7—7 of FIG. 3.

A pair of opposite embossments 25 integrally extends upwardly from a top surface of the sidewalls 23, 24 and integrally connects with the end wall 21 (22) for functioning as a stop. Each end wall 21 (22) defines a pair of slots 214 (224) recessed outwardly from a stop surface of the slit 210 (220), as clearly shown in FIG. 7. The housing 2 has indicia 26 molded therein to assist a correct electrode orientation of the battery 4 in the holder 1. The housing 2 also has a positioning post 28 extending downwardly for being inserted into a corresponding through hole of a circuit board (not shown) on which the holder 1 is mounted.

Referring to FIGS. 2–7 in conjunction with FIG. 1, the conductive contacts 3 are respectively inserted into the slits 210, 220 of the housing 2 from the top surfaces of the end walls 21, 22. Each contact 3 is stamped from a single piece of metal sheet and comprises a main portion 30 received in the first portion 2100 (2200) of the slit 210 (220), a contact portion 32 integrally punched from the main portion 30 and projecting into the receiving space 20 through the recess 212 (222), a pair of intermediate portions 34 perpendicularly extending from opposite side edges of the main portion 30 to be received in the second portions 2102 (2202) of the slit 210 (220), and a pair of side beams 36 integrally extending from a lower position of the intermediate portions 34. The main portion 30 has a pair of integrally punched tabs 300 received in the slots 214 (224) of the end wall 21 (22), and a pair of barbed edges 302 interferentially engaging with the end wall 21 (22) in the slit 210 (220). Thus, the contacts 3 are stably secured in the housing 2 of the holder 1. The contacts 3 each also include a tail 37 downwardly extending from the main portion 30 for electrically connecting to the circuit board.

The contact portion 32 of the contact 3 has a convex contour for guiding the battery 4 into the holder 1. The contact portion 32 includes an inwardly extending projection 320 for electrically engaging with a corresponding terminal of the battery 4. Each side beam 36 of the contact 3 includes a first elongate section 360 substantially perpendicular to the main portion 30, a second section 362 integrally upwardly extending from a free end of the first section 360. The second section 362 has a body 364 perpendicular to the first section 360 and an arm 366 bent inwardly from the body 364 to be formed at an acute angle with respect to the body 364. The first section 360 is deflectable about a first end (not labeled) which is connected with the intermediate portion 34. The second section 362 has a second end (not shown) connected to the first section 360 and an abutment 3660 at a free end thereof for contacting with the exterior surface of the inserted battery 4. The abutment 3660 is moveable according to the deflection of the first section 360 as well as is deflectable about the second end of the second section 362.

The second section 362 defines a channel 38 to further increase the elasticity of the side beam 36. When the side beam 36 is required to have a large deformation, the arm 366 of the second section 362 can deflect outwardly to go through the channel 38. In addition, the embossment 25 can stop a corresponding side beam 36 of the contact 3 from deflecting outwardly too excessively, thereby preventing the side beam 36 from being plastically deformed.

Referring to FIGS. 8–11, when the battery 4 is installed into the receiving space 20 of the housing 2, the arms 366 of the second sections 362 of the side beams 36 first deflect outwardly through the notch 241 in an upper portion of the housing 2 to facilitate insertion of the battery 4, then the arms 366 spring inwardly to snugly abut against the inserted battery 4 for reliably retaining the battery 4 in the holder 1. Simultaneously, the inwardly extending projections 320 of the contact portions 32 respectively abut against a positive terminal 40 and a negative terminal 42 of the battery 4, whereby an electrical connection is established between the battery 4 and the circuit board on which the holder 1 is mounted.

It is noted that a feature of the present invention is that the side beam 36 of the contact 3 can provide a large deformation due to its configuration. Thus, the battery 4 can be easily assembled to the holder 1 via the deformation of the side beam 36. After the battery 4 is completely placed in the receiving space 20 of the holder 1, the side beam 36 spring inwardly to exert a large lateral and downward force on the battery 4 for reliably securing the battery 4 in the holder 1.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A holder for receiving a battery therein, comprising:
   a dielectric housing including a pair of opposite end walls and pair of opposite sidewalls to thereby define a receiving space; and
   a first and a second members of conductive material attached to the housing, the first and the second members being spaced from each other a first predetermined distance in a longitudinal direction of the housing for receiving the battery therebetween, the first and the second members respectively providing a first and a second elastic side beams spaced from each other a second predetermined distance in a transverse direction of the housing, each elastic side beam having a first section extending in the longitudinal direction of the housing and a second section connected to the first section, the first section being deflectable about a first end thereof, the second section having a second end connected to the first section and an abutment for contacting with the battery, the abutment being moveable according to the deflection of the first section as well as being deflectable about the second end of the second section; wherein
   the second section is generally perpendicular to the first section; wherein
   the second section includes a body connected with the first section and an arm bent inwardly from the body, the abutment being formed at a free end of the arm; wherein
   the second section defines a channel for increasing elasticity of the side beam and for the arm extending therethrough; wherein
   each of the first and the second members has a pair of the elastic beams; wherein
   each of the first and the second members includes a contact portion located between the side beams for contacting with a corresponding terminal of the battery; wherein
   each of the first and the second members includes a main portion from which the contact portion is integrally formed, the main portion having spring tabs interferentially retained in the housing; wherein
   the housing has a pair of embossments adjacent to said one end wall for abutting against the side beams of said contact.

2. The holder as claimed in claim 1, wherein each pair of the elastic beams perpendicularly extends from opposite side edges of the main portion.

3. The holder as claimed in claim 1, wherein the housing has indicia molded therein to assist a correct electrode orientation of the battery in the housing.

4. A holder for holding a battery therein comprising:

a dielectric housing including a pair of opposite end walls and a pair of opposite sidewalls to thereby define a receiving space; and a pair of conductive contacts retained in the end walls, the conductive contacts each including a contact portion projecting into the receiving space for electrically engaging with an inserted battery and a tail for connecting to a circuit board, one of the conductive contacts including a pair of side beams spaced from each other a predetermined distance, each side beam including a first section and a second section connected to the first section, the second section having a body and an arm bent inwardly from the body for abutting against the inserted battery; wherein the second section of the side beam defines a channel for increasing elasticity thereof; wherein said one conductive contact includes a main portion from which the contact portion is integrally formed and the side beams integrally extend inward; wherein one of the end walls defines a slit receiving the main portion of said one contact therein; wherein said one end wall defines a pair of slots recessed outwardly from a stop surface of the slit, and the main portion of said one contact has a pair of tabs fittingly received in the slots; wherein the housing has a pair of embossments adjacent to said one end wall for abutting against the side beams of said contact.

* * * * *